United States Patent
Aoyama et al.

[11] Patent Number: 5,912,074
[45] Date of Patent: *Jun. 15, 1999

[54] POLYESTER COMPOSITION AND FILM

[75] Inventors: Masatoshi Aoyama, Shiga-ken; Hiroji Kojima, Osaka-fu; Masaru Suzuki, Shizuoka-ken, all of Japan

[73] Assignee: Toray Industries, Inc., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/682,954

[22] Filed: Jul. 18, 1996

[30] Foreign Application Priority Data

Jul. 27, 1995 [JP] Japan ................................. 7-192317

[51] Int. Cl.$^6$ .......................... B32B 5/30; B32B 27/36
[52] U.S. Cl. ...................... 428/327; 428/283; 428/329; 428/330; 428/331; 428/338; 428/339; 428/480
[58] Field of Search ..................... 428/283, 338, 428/339, 327, 329, 331, 330, 480

[56] References Cited

U.S. PATENT DOCUMENTS

| | | | |
|---|---|---|---|
| 3,958,064 | 5/1976 | Brekken | 428/336 |
| 5,474,854 | 12/1995 | Kagami | 428/482 |
| 5,510,169 | 4/1996 | Greczyna | 428/417 |

FOREIGN PATENT DOCUMENTS

| | | |
|---|---|---|
| 0 125 482 | 11/1984 | European Pat. Off. . |
| 0372423 | 6/1990 | European Pat. Off. . |
| 0 546 184 | 6/1993 | European Pat. Off. . |
| 0 577 281 | 1/1994 | European Pat. Off. . |
| 30 19 073 | 11/1990 | Germany . |
| 02084445 | 3/1990 | Japan . |

*Primary Examiner*—Patricia A. Short
*Attorney, Agent, or Firm*—Morrison & Foerster LLP

[57] ABSTRACT

A polyester composition comprises a polyester component (a) and polymer particles (b). At least an outermost layer of the polymer particles (b) is of a polymer having hydroxyl groups. The composition can be made into a film especially suitable for use as a substrate in a magnetic recording medium.

34 Claims, No Drawings

POLYESTER COMPOSITION AND FILM

FIELD OF THE INVENTION

The present invention relates to a polyester composition and to a film made thereof. In more detail, it relates to a polyester composition capable of moulding to form a product, especially a film, having excellent slipperiness and abrasion resistance, and to a film made thereof.

DESCRIPTION OF THE RELEVANT ART

Polyesters are widely used in various areas, for example, as films for magnetic tapes, electric applications, photography, metallization and packaging, because of their excellent properties. Polyester films, especially polyethylene terephthalate film and polyethylene-2,6-napthalate film are excellent in flatness, mechanical strength, chemical properties, dimensional stability, etc. and are suitably used as base films of magnetic recording media, etc.

A base film for magnetic recording media is required to be good in the flatness, slipperiness, abrasion resistance, etc. of the film surface. For example, for application to video tapes, the base film is required to be flatter on the surface for achieving higher recording accuracy. However, if the surface becomes flatter, the film declines in slipperiness, to increase the friction and wear of the surface, thus causing many defects such as surface flaws and abrasion dust. In this case, if the film is low in abrasion resistance on the surface, much abrasion dust of the film is generated during the production of magnetic tape, and when it is coated with a magnetic layer, it cannot be perfectly coated, to leave some portions uncoated, causing the portions to be devoid of magnetic recording (drop-outs). Also when the magnetic tape is used, it runs in contact with guide pins in a recorder when used in ordinary recording/reproducing mode, or runs in contact with mechanical parts during high speed dubbing in a high speed printer for production of soft tape, etc., and under these running conditions, the contact of the tape with mechanical parts causes abrasion dust, hence drop-outs.

To provide slipperiness, particles are added to the film, to roughen the surface for decreasing abrasion, and on the other hand, for the purpose of improving abrasion resistance to inhibit the decline of recording accuracy due to the above drop-outs, particles capable of forming protrusions less likely to come off are demanded.

As particles added for the above purpose, in recent years, organic polymer particles have been proposed to substitute conventional inorganic particles such as silica. organic polymer particles are high in affinity for polyesters, and since they are more resilient than inorganic particles, they generate less voids around them when the polyester is molded into a film, and can be expected to provide excellent abrasion resistance.

For example, JP-A-55-099948 proposes the use of particles made of, for example, a methyl methacrylatedivinylbenzene based polymer and JP-B-06-008383 proposes the use of organic particles covered with a crosslinked polymer containing ethylene glycol as a component. Furthermore, JP-B-02-020415, proposes the use of a crosslinked polymer with epoxy groups, while JP-A-06-145487, proposes the use of particles made of a polyester based polymer.

However, technological progress in the magnetic recording area in recent years has been accompanied by more severe service conditions, and even the above techniques cannot provide films with sufficient abrasion resistance. Furthermore, even though abrasion resistance can be enhanced, the surfaces of the particles become more reactive to promote. the cohesion between particles, allowing them to be dispersed only insufficiently in the polymer disadvantageously.

OBJECT OF THE INVENTION

The present invention addresses the problems of overcoming disadvantages of the above mentioned prior art so as to provide a polyester composition which provides a good dispersibility of particles in the molded product and which can be molded, for example, into a film, having the desired properties such as good slipperiness and abrasion resistance. Above all, it is intended to provide a polyester composition and film excellent in abrasion resistance under two different conditions of magnetic tape use; running at a relatively low speed in contact with guide pins for recording/reproducing, etc. and running at a high speed in contact with parts for high speed dubbing, etc.

A solution to the above problems is achievable by a polyester composition and film containing polymer particles made of a polymer with hydroxyl groups, preferably a polymer having a structural unit represented by formula (1)

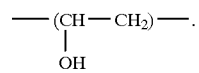

Formula (1)

Thus, the present invention provides a polyester composition comprising (a) a polyester component and (b) polymer particles at least an outermost region of which comprises a polymer and which polymer has hydroxyl groups. Preferably, the polyester composition comprises (a) a polyester component and (b) polymer particles selected from (i) particles comprising a polymer having hydroxyl groups, more preferably at least in an outermost region of the particles, and having a volume average particle diameter of 0.005 to 2 $\mu$m; and (ii) multi-layer particles at least an outermost layer of which comprises a polymer and which polymer has hydroxyl groups, and which multi-layer particles more preferably have an average particle diameter of 0.005 to 2 $\mu$m.

Preferably, the polyester component provides a matrix component and the polymer particles a particulate component dispersed within the matrix component.

A composition in accordance with the invention may contain the polymer particles in an amount of from 0.005 to 3% by weight of the total weight of the composition and such a composition is especially suitable for formulating into a film.

According to another aspect, the invention provides a film comprising a composition of the invention in which the polymer particles are preferably present in an amount of from 0.005 to 3% by weight of the total weight of the film. Preferred embodiments of the invention will now be described in more detail.

The polyester used in the present can be any polyester as far as it can form a film. It can be, for example, polyethylene terephthalate, polytetramethylene terephthalate, polycyclohexylenedimethylene terephthalate, polyethylene-2,6-naphthalate or polyethylene-1,2-bis(2-chlorophenoxy)ethane-4,4'-dicarboxylate. Among these, polyethylene terephthalate and polyethylene-2,6-naphthalate are preferable. If a high elastic modulus is desired, polyethylene-2,6-napthalate is especially preferable.

Any of these polyesters can be copolymerized with any of dicarboxylic acids such as adipic acid, isophthalic acid, sebacic acid, phthalic acid and 4,4'-diphenyldicarboxylic acid, their ester formable derivatives, dihydroxy compounds such as polyethylene glycol, diethylene glycol, hexamethylene glycol, neopentyl glycol and polypropylene glycol, hydroxycarboxylic acids such as p-(β-hydroxyethoxy) benzoic acid, and their ester formable derivatives.

The polymer of at least a part of a given particle of the polymer particles in a composition of the present invention contains hydroxyl groups. The hydroxyl groups can exist on the main chain or on a side chain of the polymer or on crosslinked portions in the case of a crosslinked polymer. The hydroxyl group content is preferably $1 \times 10^{-5}$ mole or more, more preferably $1 \times 10^{-4}$ mole or more per 1 g of the particles having regard to achieving sufficient affinity for the polyester. Furthermore, for improving the dispersibility of particles, the hydroxyl group content is preferably $5 \times 10^{-2}$ mole or less, more preferably $1 \times 10^{-2}$ mole or less per 1 g of the particles.

The reason why the particles of the present invention show good abrasion resistance is not clear. However, although not wishing to be bound by theory, it is suggested that the attached hydroxyl groups remarkably enhance interaction between the polymer of the particles and the polyester.

Moreover, the particles used in a composition of the present invention are preferably made of a polymer having a structural unit represented by formula (1):

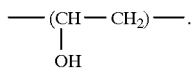

Formula (1)

The content of the structural unit is preferably 2 wt % to 60 wt % based on the weight of the particles. If the content is less than 2 wt %, the affinity for the polyester provided by the structural unit cannot be sufficiently achieved, and if the content is 60 wt % or less, the activity on the surfaces of the particles can be moderately controlled, so that cohesion between particles becomes less likely.

Furthermore, the polymer particles in a composition of the present invention are preferably made of a polymer having a structural unit represented by formula (2),

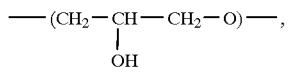

Formula (2)

which structural unit (2) contains the structural unit (1), thereby enabling even higher abrasion resistance to be achieved.

The hydroxyl groups can be provided on, or indeed the entire component represented by formula (1) or (2) can exist in, the main chain of the polymer, or can exist in the graft portions or in the crosslinked portions in the case of a crosslinked polymer. It is especially preferable having regard to the dispersibility of the particles that the particles are made of a crosslinked polymer and that at least a proportion of the structural units represented by formula (1) or (2) exists in the crosslinked portions of the particles.

The average particle diameter of the polymer particles in the present invention is preferably 0.005 to 2.0 μm, more preferably 0.02 to 1 μm, still more preferably 0.05 to 1.0 μm. If the average particle diameter of the polymer particles is less than 0.005 μm, the film may have insufficient slipperiness, and if more than 2.0 μm, the film may have insufficient abrasion resistance.

If the polymer particles of the present invention are uniform in particle diameter, the protrusions are formed uniformly on the surface of the film, and less coarse particles are present, so providing better slipperiness and abrasion resistance. Specifically, the relative standard deviation in the average particle diameter distribution of the polymer particles is preferably 0.5 or less, more preferably 0.3 or less, still more preferably 0.15 or less. The polymer particle content in a film of the present invention may be 0.005 to 3.0 wt %, preferably 0.01 to 2.0 wt %, more preferably 0.05 to 1.0 wt % based on the weight of the polyester. If the content is less than 0.005 wt %, the film may have insufficient slipperiness, and if more than 3.0 wt %, the film may have insufficient abrasion resistance. The polymer used as the particles of the present invention can be selected from, though not limited to, vinyl based polymers, silicone resins, unsaturated polyester based polymers, polyamide based polymers, polyimide based polymers and polyamidoimide based polymers. Among these, a vinyl based crosslinked polymer is preferable because it can be obtained in a particulate form in which the particles have a relatively sharp particle diameter distribution and because it allows easy introduction of hydroxyl groups or the structural unit represented by formula (1).

A vinyl based crosslinked polymer which may be used for the particles is a copolymer consisting of residues derived from a monovinyl component (P), which is at least one monovinyl compound with only one aliphatic unsaturated bond in the molecule and a crosslinking component (Q), which is at least one compound with two or more aliphatic unsaturated bonds in the molecule as a crosslinking component.

The compound of component P can be, for example, an aromatic monovinyl compound such as styrene, α-methylstyrene, fluorostyrene, vinyl pyridine or ethylvinylbenzene, a vinyl cyanide compound such as acrylonitrile or methacrylonitrile, an acrylate compound such as methyl acrylate, ethyl acrylate, propyl acrylate, hexadecyl acrylate, octyl acrylate, dodecyl acrylate, hexadecyl acrylate, or N,N'-dimethylaminoethyl acrylate, a methacrylate compound such as methyl methacrylate, ethyl methacrylate, propyl methacrylate, isopropyl methacrylate, butyl methacrylate, sec-butyl methacrylate, acryl methacrylate, phenyl methacrylate, benzyl methacrylate, 2-ethylhexyl methacrylate, 2-hydroxyethyl methacrylate, or N,N'-dimethylaminoethyl methacrylate, a mono- or di-carboxylic acid such as acrylic acid, methacrylic acid, maleic acid or itaconic acid, a di-carboxylic anhydride, or an amide based compound such as acrylamide or methacrylamide.

The compound of component Q can be, for example, a divinylbenzene compound, or a polyacrylate or polymethacrylate such as trimethylolpropane triacrylate, trimethylolpropane trimethacrylate, ethylene glycol diacrylate, ethylene glycol dimethacrylate, polyethylene glycol diacrylate, polyethylene glycol dimethacrylate, 1,3-butylene glycol diacrylate, or 1,3-butylene glycol dimethacrylate.

In this case, if a monomer or oligomer having at least one hydroxyl group or a having a structural unit represented by formula (1) is used at least as a proportion of the component P and/or the component Q, a polymer useful for the particles of the present invention can be obtained. Above all, if a compound obtained by adding an unsaturated monobasic acid B to a compound A with two or more glycidyl groups in one molecule is used as at least a proportion of the component Q, the structural unit represented by formula (1) can be preferably efficiently introduced.

The compound A can be a monocyclic compound such as resorcinol diglycidyl ether, hydroquinone diglycidyl ether, phthalic acid diglycidyl ester, isophthalic acid diglycidyl ester, terephthalic acid diglycidyl ester, cyclohexanedimethanol diglycidyl ether, cyclohexene diglycidyl ether, cyclohexanediene diglycidyl ester, or cyclohexanediene diglycidyl ether, or a polycyclic compound such as bisphenol A diglycidyl ether, or hydrogenated bisphenol A diglycidyl ether. Especially if a compound with a benzene ring, cyclohexane ring or bisphenol A component as its skeleton is used, the particles obtained are particularly good in heat resistance.

The compound B can be, for example, acrylic acid, methacrylic acid, or any of their derivatives. In this case, the structural unit represented by formula (1) is formed by the condensation reaction between the glycidyl groups of the compound A and the carboxyl group of the compound B in the reaction to synthesize the particles. Furthermore, if the diglycidyl diacrylate structural unit thus obtained is used as at least one of the compounds of component Q as a crosslinking component, for copolymerization with a compound of component P such as styrene, the polymer particles of the present invention can be obtained.

Preferable compositions for the vinyl based crosslinked polymer particles include styrene/resorcinol diglycidyl ether diacrylate copolymer, styrene/cyclohexanedimethanol diglycidyl ether diacrylate copolymer, styrene/cyclohexene diglycidyl ether diacrylate copolymer, styrene/cyclohexanediene diglycidyl ester diacrylate copolymer, styrene/bisphenol A diglycidyl ether diacrylate copolymer and styrene/bisphenol A diglycidyl ether dimethacrylate copolymer.

To confirm that the particles contain hydroxyl groups, or a component represented by formula (1) or (2), various methods can be used without any restriction. For example, the particles can be dissolved into a solvent not containing any hydroxyl group, and acetylated and the amount of the acetylating agent consumed can be measured for determining the content. As another method, the particles can be directly analyzed by IR, and the absorption intensity attributable to the hydroxyl groups at 3400 $cm^{-1}$ or 3600 to 3700 $cm^{-1}$ can be measured for determining the content. As a further alternative method, the particles can be thermally decomposed, and the generated decomposition gas can be isolated by gas chromatography, and subjected to mass spectrometry. By using any one or more in combination of these known methods, the chemical composition of the particles can be identified.

Vinyl based crosslinked polymer particles can be produced by any of various methods such as emulsion polymerization, suspension polymerization, and dispersion polymerization, but to obtain fine particles sharp in particle diameter distribution, emulsion polymerization can be preferably adopted.

The emulsion polymerization can be effected, for example, by any of the following methods:
(a) Soap-free polymerization method, in which no emulsifying agent or a very small amount of an emulsifier is used for polymerization.
(b) Seed polymerization method, in which polymer particles are added into the polymerization system prior to emulsion polymerization.
(c) Core-shell polymerization method, in which at least a proportion of the monomers are emulsion-polymerized, and in the polymerization system, the remaining monomers are polymerized.
(d) Polymerization methods employing, for example, the Ugelstad procedure, disclosed in JP-A-54-097582.
(e) Polymerization methods without using any swelling assistant in the methods of (d).

The polymer particles present in a polyester composition of the present invention are not necessarily required to be homogeneous entirely, but can also be multi-layer particles, each of which has a layer containing hydroxyl groups, provided for example, by a component represented by formula (1) as the outermost layer. Such multi-layer particles can be prepared by synthesizing particles as cores beforehand, and subsequently adding a monomer containing a hydroxyl group, provided by, for example, the component represented by formula (1), into the polymerization system of the particles to grow the core particles for forming the outer layer around each of the cores. The core-shell type particles allow the time of the entire production process to be shortened since the core particles can be produced separately. Furthermore, since the cores have no or little portion in direct contact with the polyester, an inorganic compound can also be used instead of an organic compound. The use of inorganic particles is especially preferable since the particles obtained can be excellent in heat resistance as a whole and furthermore hard.

The size of the particles used as cores is not especially limited, but is preferably 0.005 to 0.5 $\mu$m, and it is preferable that the volume of each core particle accounts for 90% or less of the volume of the entire multi-layer polymer particle. If the percentage is 50% or less, especially 20% or less, the affinity between the polymer forming the outermost layer and the polyester can be especially well achieved.

The particles used as cores are not required to contain the component represented by formula (1), or indeed any other unit providing a hydroxyl group, and any conventional particles can be used. They can be, for example, organic particles of a polyimide, polyamidoimide, polymethyl methacrylate, formaldehyde resin, phenol resin, crosslinked polystyrene or silicone resin, or inorganic particles of, for example, colloidal silica, titanium dioxide, calcium carbonate, aluminum oxide, zirconium oxide, kaolin or talc. Among these, particles of a vinyl based crosslinked polymer such as crosslinked polystyrene or colloidal silica are especially preferable since particles high in heat resistance and uniform in particle diameter distribution can be easily obtained.

To achieve particularly well the effect of abrasion resistance intended in the present invention, in the case of core-shell particles, the thickness of the shell is preferably 0.01 $\mu$m or more, more preferably 0.05 $\mu$m or more. The thicknesses of the respective layers of a multi-layer particle can be measured by cutting out a very thin slice from a polyester chip containing the particles, and observing a particle with a great circle on the cut face using a transmission electron microscope. If the respective layers are not different in their transmittance of the electron beam, making it difficult to identify the layer interface, dyeing or any other method can be used together to make such observation.

The polymer particles present in a composition of the present invention preferably have a heat resistance given by a thermal decomposition temperature of 350° C. or more, more preferably 360° C. or more, still more preferably 370° C. or more, which thermal decomposition temperature can be measured using a thermo-balance (10% loss temperature at a heating rate of 10° C./min in nitrogen current); when the particles have such high heat resistance, the polyester composition can be produced or melt-molded and the molded product can recovered for reutilization, without cohesion of the particles, so that the surface homogeneity, abrasion resistance, etc. of film are not impaired.

If the difference in density between the particles and the polyester as the matrix conforms to a particular relationship, the particles are less likely to settle or float while the polyester composition is kept molten, hence the concentration of particles is less uneven. This relationship may be represented by $$|DP-DM| \leq 0.3 (g/cm^3); \quad \text{Formula (3)}$$

where DP stands for the density of polymer particles, and DM, the density of the polyester used as the matrix. Furthermore, also when a film is formed, the difference in density also preferably conforms to a particular relationship, since then again the concentration of particles is less uneven. This relationship may be represented by $$|DP-DF| \leq 0.3 (g/cm^3); \quad \text{Formula (4)}$$

where DF stands for the density of the film.

The polyester composition of the present invention can be prepared, for example, by adding the polymer particles used in accordance with the present invention as a powder or glycol slurry, or by kneading them as a powder or a slurry of a low boiling point solvent into the polyester, during the production of the polyester, for example, in the case of an ester interchange method, during the ester interchange reaction or during the subsequent polymerization reaction, or in the case of a direct polymerization method, at any desired time. In an especially preferred method, the particles are kneaded into the polyester as a slurry in water and/or an organic compound having a boiling point of 200° C. or less; in this manner the particles can be well dispersed. In this case, it is more preferable to use a vent type extruder for degassing. As the vent type extruder, a two-screw extruder is especially preferable since it allows excellent kneading.

If, as is preferred, a known surfactant, for example, an anionic surfactant such as sodium dodecylbenzenesulfonate, sodium lauryl sulfate, sodium dialkylsulfosuccinate, or formalin condensation product salt of naphthalenesulfonic acid, nonionic surfactant such as polyoxynonyl phenol ether, polyethylene glycol monostearate or sorbitan monostearate, water soluble synthetic polymer such as polyvinyl alcohol, polyvinyl pyrrolidone or polyethylene glycol, natural polymer such as gelatin or starch or a water soluble semi-synthetic polymer such as carboxymethyl cellulose, is added to a slurry of the organic polymer particles, the particles can be well dispersed in the slurry, and also in the polyester composition.

Furthermore, the polyester composition or film of the present invention can contain particles A and/or particles B described below in addition to the polymer particles as far as the effect of the present invention is not impaired. The particles A are preferably 0.005 to 1.0 µm, more preferably 0.01 to 0.5 µm in volume average particle diameter having regard to abrasion resistance, running stability, surface homogeneity, etc. Moreover, the particles A are preferably smaller than the polymer particles by 0.1 µm or more having regard to abrasion resistance, surface homogeneity, etc. Furthermore, the particles A are preferably 10 $m^2/g$ or more in specific surface area and 6 or more in Mohs' hardness since this further improves abrasion resistance.

The content of the particles A is preferably 0.005 to 3.0 wt %, more preferably 0.01 to 2.0 wt % based on the weight of the polyester, having regard to abrasion resistance, surface homogeneity, etc. The particles A can be made of, for example, silicon oxide, titanium oxide, zirconium oxide, aluminum oxide, spinel or iron oxide. Among these materials, zirconium oxide and aluminum oxide are especially preferable having regard to affinity for the polyester, abrasion resistance, dispersion stability, etc.

On the other hand, the particles B are preferably 0.05 to 2.0 µm in volume average particle diameter having regard to running stability, surface homogeneity, etc. Furthermore, it is preferable having regard to running stability, surface homogeneity, etc. that the difference in volume average particle diameter between the particles B and the polymer particles is 0.1 µm or more, and it is especially preferable having regard to running stability that the difference is 0.2 µm or more. It is especially preferable that the particles B are larger than the polymer particles in particle diameter. Moreover, the particles B are preferably less than 4 in Mohs' hardness since abrasion resistance is then further improved. The content of the particles is preferably 0.005 to 0.3 wt % having regard to running stability, surface homogeneity, etc. The particles B can be, for example, inorganic particles of talc, calcium sulfate, barium sulfate, calcium carbonate or zinc sulfide. Among these, calcium carbonate is especially preferable having regard to affinity for the polyester, surface homogeneity, dispersion stability, etc. Moreover, in addition to the above mentioned various particles, the polyester composition may contain internally precipitated particles, i.e., the particles precipitated in the polyester polymerization reaction system, especially a system with at least one of alkali metals and alkaline earth metals, and phosphorus as partial components.

Of course in the present invention, two or more kinds of the polymer particles (b) described above with reference to the invention can also be used together.

A polyester film containing both the inorganic particles or internally precipitated particles and the polymer particles described above with reference to the present invention can be produced, for example, by adding the respective kinds of particles to the polyester reaction system or while the reaction mixture is re-melted and kneaded, and then molding the polyester composition into a film, or by adding the respective kinds of particles separately to the polymer, to prepare different kinds of master chips, and blending and melt-kneading the respective kinds of chip before or during film molding.

The film made of the polyester composition of the present invention can be either a single-layer film or a laminate film, but having regard to surface flatness, a laminate film containing at least one film made of the polyester composition of the present invention is preferable. A laminate film consisting of three or more layers is more preferable, and it is especially preferable that the film made of the polyester composition of the present invention is used as at least one of the outermost layers of the three-layered laminate film.

In this case, a three-layered laminate film with the polymer particles of the present invention contained in both the outermost layers is preferable having regard to running ability and dubbing property, and in this case, if internally precipitated particles as described above are contained in the central layer and/or the outermost layers, running ability is especially good. Furthermore, a reclaimed polymer generated in the production of the film can preferably be used as at least part of the central layer, to save cost.

Having regard to abrasion resistance, it is especially preferable that films made of the polyester composition of the present invention are arranged as the outermost layers, that the relation between the thickness t of each film and the average particle diameter D of the organic polymer particles satisfies $0.2D \leq t \leq 10D$, preferably $0.5D \leq t \leq 5D$, more preferably $0.5 \leq t \leq 3D$, and that the thickness of each outermost layer is preferably 0.005 to 3 μm, more preferably 0.01 to 2 μm, still more preferably 0.01 to 1 μm.

The film has preferably at least $2 \times 10^3$ to $1 \times 10^6$ protrusions/mm², more preferably $3 \times 10^3$ to $5 \times 10^5$ protrusions/mm², still more preferably 5 to $10^3$ to $4 \times 10^5$ protrusions/mm² per side having regard to abrasion resistance.

Especially for an application requiring a high elastic modulus or a very thin film, the film preferably conforms to a particular relationship, since the film then has improved stiffness. This relationship may be represented by $$F5MD + F5TD \geq 30 kg/mm^2 \quad \text{Formula (5)}$$

where F5 represents an elastic modulus at an elongation of 5%, and F5MD represents an F5 value in the machine direction, while F5TD represents an F5 value in the transverse direction.

A method for producing a film made of the polyester composition of the present invention is described below with reference to a laminate film.

Pellets containing predetermined amounts of the organic polymer particles of the present invention and other particles as required are dried, supplied into a known melt-extruder, extruded from a slit die as a sheet, and cooled and solidified on a casting roll, to make an undrawn film. In the case of a laminate film, two or more extruders and a manifold or joining block for two or more layers are used, for laminating the molten polyester. In this case, in the passage containing particles, a static mixer and gear pump can also be installed.

The undrawn film is biaxially drawn, to be biaxially oriented. The drawing can be sequential biaxial drawing or simultaneous biaxial drawing. However, it is preferable to draw in the machine direction at first and then to draw in the transverse direction subsequently as sequential biaxial drawing, with the drawing in the machine direction divided in 3 or more steps, at a longitudinal drawing temperature of 80° C. to 160° C., at a total longitudinal drawing ratio of 3.0 to 7.0 times and at a longitudinal drawing rate of 5,000 to 50,000%/min. For drawing in the transverse direction, it is preferable to use a stenter at a drawing temperature of 80 to 160° C., at a transverse drawing ratio of 3.0 to 7.0 times which is higher than the longitudinal drawing ratio, and at a traverse drawing rate of 1,000 to 20,000%/min. Subsequently, the drawn film is heat-treated preferably at 160 to 220° C. for 0.5 to 60 seconds.

DESCRIPTION OF THE PREFERRED EMBODIMENTS

Especially preferred embodiments of the present invention will now be described below in more detail with reference to Examples and comparative Examples. Methods for measuring the respective property values were as follows:

(1) Average particle diameter

In principle, the particles in the polyester composition or film were directly measured. However, when observation was difficult because the refractive index of the particles was too close to that of the polymer or when the distinction from the inorganic particles used together was complicated, the particles as a powder or slurry were measured before they were added to the polyester.

(A) To measure the particles as a powder or slurry:

The particles were placed on the object stage of an electron microscope without overlapping them as far as possible, and observed at a magnification of 10,000 to 100,000 times using a scanning electron microscope or transmission electron microscope. In the case of a scanning electron microscope, on the surface of a sample, a platinum film of about 200 Å was vapor-deposited using a sputtering apparatus beforehand. From the screen or photographed image, the areas of at least 200 particles were measured to calculate the equivalent diameters, and from the area equivalent diameters, the volumes of the individual particles were calculated. Based on the volumes, the volume average particle diameter was calculated.

(B) To measure the particles in a film:

A film was cut in the machine direction, to prepare a very thin slice of about 0.1 μm in thickness, and the section was observed in the transverse direction (in the direction orthogonal to the machine direction in the film plane) at a magnification of 10,000 to 100,000 times by a transmission electron microscope. From the screen or photographed image, the areas of at least 200 particles were measured to calculate the equivalent diameters, and from the area equivalent diameters, the volumes of the individual particles were calculated. Based on the volumes, the volume average particle diameter was calculated.

(2) Particle content

The particle content was calculated from the amount of particles added into the polyester used as the raw material of the film, or by dissolving the polyester composition or film obtained, into a solvent not dissolving the particles, centrifuging the solution, to isolate the particles from the polymer, and calculating the percentage of the weight of the particles to the weight of the entire film.

(3) Thermal decomposition temperature of particles

The particles to be measured were dried at 25° C. for 24 hours in vacuum beforehand, to remove the deposited water and constituents of low volatility. Then, measurements were taken, using a thermo-balance, in a nitrogen current at a heating rate of 10° C./min, and the temperature when 10% was lost was identified as the thermal decomposition temperature.

(4) Density

The densities of the film and particles therein referred to in formulae (3) and (4) were obtained by the following measuring methods respectively.

(a) Density of polyester and film: Density gradient tubes containing carbon tetrachloride and n-heptane were used for measuring at 25° C.

(b) Density of particles

Measured according to JIS-Z-8807.

(5) Laminated layer thickness of laminate film

The concentration ratio ($M^+/C^-$) of the element of the particles with the highest concentration among the particles in the film in a range from the surface to a depth of 3000 nm, to the carbon element of the polyester was defined as particle concentration, and a secondary ion mass spectrometer (SIMS) was used for analyzing in the thickness direction from the surface to a depth of 3000 nm. In the surface layer, the particle concentration was low, but with an increase in distance from the surface, it became higher. In the case of the film of the present invention, the particle concentration, after once reaching a maximum value, began to decrease again. Based on this concentration distribution curve, the depth at which the maximum value became ½ of the particle concentration of the surface layer (this depth was deeper than the depth at which the particle concentration became maximum) was identified as the laminated layer thickness. The measurement conditions were as follows:

<1> Measuring instrument
Secondary ion mass spectrometer (SIMS): A-DIDA 3000 produced by Atomika, Germany <2> Measuring conditions
Primary ion species: $O^{2+}$
Primary ion acceleration voltage: 12 kV
Primary ion current: 200 nA
Raster region: 400 $\mu$m square
Analyzed region: Gate 30%
Testing vacuum degree: $6.0 \times 10^{-9}$ torr
E-Gun: 0.5 kV–3.0 A When the particles are present mostly in a thickness region ranging from the surface to a depth of 3000 nm and are organic polymer particles, measurement by SIMS is difficult. In such a case, with etching from the surface, the depth profile can be measured as above by XPS (X-ray photoelectric spectrometry) or IR (infrared spectrometery), etc. to identify the laminated layer thickness, or a section can be observed by an electron microscope, etc. to recognize the interface with reference to the change in particle concentration or the difference in contrast due to the difference of polymers, for identifying the laminated layer thickness. As a further alternative method, the laminated polymer can be removed to identify the laminated layer thickness using a thin film surface roughness meter.

(6) Number of protrusions on surface of film

Measured protrusion heights obtained with the height of the flat face of the film surface as 0 using a two-detector type scanning electron microscope, ESM-3200 (produced by Elionics Corporation) and a section measuring instrument, PMS-1 (produced by Elionics Corporation) were applied to an image processor, IBAS 2000 (produced by Karl Zeiss), to reconstruct the film surface protrusion image on the image processor. Then, for each protrusion expressed by binary numbers on the surface protrusion image, the highest number was identified as the height of the protrusion. This measurement was repeated 500 times at different places, to identify protrusions of 20 nm or more as protrusions, for obtaining the number of protrusions. The magnification of the scanning type electron microscope was selected in a range from 1,000 to 8,000 times. As the case may be, the results obtained by a high precision light interference type three-dimensional surface analyzer, TOPO-3D (produced by WYKO) using an objective lens of 40 to 200 times and a high resolution camera can be used instead of the data of the above scanning electron microscope.

(7) F5 value of film

The initial stress per unit sectional area of the film at an elongation of 5% was obtained according to ASTM D 882–83.

(8) Slipperiness of film

The film was slit at a width of 1.27 cm and fed using a tape running tester, Model TBT-300 (produced by K. K. Yokohama System Kenkyujo) in an atmosphere of 20° C. and 60% RH, and the initial friction coefficient, $\mu$k was obtained from the following formula. The guide diameter was 6 mm, and the guide material was SUS 27 (surface roughness 0.2 S). The winding angle was 180° and the running speed was 3.3 cm/sec.

$\mu k = 0.733 \times \log(T_1/T_2)$ $T_1$: Outgoing-side tension
$T_2$: Incoming-side tension If $\mu$k, as defined above was 0.35 or less, the film was considered to have good slipperiness.

(9) Abrasion resistance of film <1> (abrasion resistance in high speed running)

A film with a width of 1.27 cm was fed in contact with a guide roll made of stainless steel SUS-27 at a winding angle of 90° at a running speed of 3.3 cm/min and at a tension of 90 g. The tape was ranked with reference to the amount of abradings generated on the surface of the guide roll after a total running distance of 10 m according to the following criterion. Grades A and B are acceptable.

Grade A . . . No abradings were generated at all.
Grade B . . . Some abradings were generated.
Grade C . . . Rather a lot of abradings were generated.
Grade D . . . Much abrading was generated.

(10) Abrasion resistance of film <2> (Abrasion resistance in high speed running)

A film with a width of 1.27 cm was fed in contact with a guide roll made of stainless steel SUS-304 at a winding angle of 60° at a running speed of 350 m/min and at a tension of 90 g. The tape was ranked with reference to the flaws in the film after a total running distance of 1000 m according to the following criterion. Grades A and B are acceptable.

Grade A . . . Less than two one-micrometer or wider flaws per tape width
Grade B . . . Two to less than ten one-micrometer or wider flaws per tape width
Grade C . . . Ten to less than twenty one-micrometer or wider flaws per tape width
Grade D . . . Twenty or more one-micrometer or wider flaws per tape width

EXAMPLE 1

Two hundred and fifty parts of bisphenol A diglycidyl ether, 50 parts of methacrylic acid, 0.5 part of hydroquinone and 1.0 part of dimethylbenzylamine were caused to react to obtain bisphenol A diglycidyl ether dimethacrylate. This was mixed with 300 parts of styrene monomer, and 600 parts of desalted water, 1 part of potassium persulfate, and 1 part of sodium lauryl sulfate were added. The mixture was heated to 70° C. in a nitrogen gas atmosphere with stirring, and polymerized for 7 hours. The conversion was 99%, and the polymer particles obtained had an average particle diameter of 0.5 $\mu$m, a relative standard deviation of particle diameter distribution of 0.13, and a thermal decomposition temperature of 370° C.

Polyethylene terephthalate chips having an intrinsic viscosity of 0.62 were melted using a vent type two-screw extruder, and a water slurry of the polymer particles prepared above (styrene/bisphenol A diglycidyl ether dimethacrylate copolymer particles) was added, to obtain a polyethylene terephthalate containing organic polymer particles (I). Separately, polyethylene terephthalate having an intrinsic viscosity of 0.62 and not containing any particles (II) was obtained according to a conventional method.

The two polymers (I) and (II) were dried under reduced pressure, and supplied to extruders 1 and 2, respectively, to be melted, then filtered at a high precision, and then laminated in three layers in a rectangular joining zone (a laminate consisting of polymer (I)/polymer (II)/polymer (I)). The laminate was cast using an electrostatic casting method and wound around a drum, to be cooled and solidified, for producing an undrawn film. The undrawn film was stretched to 4.5 times in the machine direction and to 5.5 times in the transverse direction, and heat-treated, to obtain a biaxially oriented laminate film having a total thickness of 15 µm. With reference to the particle concentration of pellets used for film formation, the organic polymer particle content of the laminated layers of the film obtained was identified as 0.3 wt %. Both the laminated layers were 1 µm in thickness respectively.

The film had a µk of 0.28 and was of Grade A abrasion resistance in both low speed running and high speed running, that is, good in all of the properties of slipperiness and abrasion resistance under the respective conditions.

The structure of the organic polymer particles used in this example was identified as follows. The particles were partially dried and their infrared absorption spectrum was examined by FT-IR, to confirm styrene from the absorption at 3000 to 2900 $cm^{-1}$ (attributable to C—H of benzene ring), a bisphenol A based epoxy resin from the absorption at 3460 $cm^{-1}$ (O—H), 1608 and 1510 $cm^{-1}$ (C=C of benzene ring), 1247 and 1041 $cm^{-1}$ (aromatic ether bond), etc., and an ester based compound from the absorption at 1727 $cm^{-1}$ (C=O).

Furthermore, the components of the gas generated when the particles were thermally decomposed were examined by gas chromatography/mass spectrometry, to detect a molecular weight of 104 (styrene), 208 (styrene dimer), 312 (styrene trimer), 86 (methacrylic acid), 228 (bisphenol A), 94, 134, 240 and 268 (decomposition products of bisphenol A epoxy resin).

The particles were subjected to extraction using a Soxhlet's extractor, and the extract was examined by 1H-NMR analysis, to confirm bisphenol A and styrene skeleton based on 7.1 and 6.8 ppm (attributable to the protons of the benzene ring), 1.6 ppm (methyl group), 1.5 ppm ($CH_2$, CH), etc.

Generally based on these results of analysis, the polymer particles were identified as styrene/bisphenol A diglycidyl ether dimethacrylate copolymer particles.

EXAMPLES 2 TO 9, AND COMPARATIVE EXAMPLES 1 TO 4

Films were produced as described in Example 1, except that the composition, particle diameter and content of the polymer particles, and lamination conditions were changed and that polyethylene-2,6-napthalate was used as the matrix polymer. As shown in Tables 1 and 2, the polyester films in conformity with the present invention were good in all of the properties such as slipperiness, abrasion resistance and windability, but those not in conformity with the present invention were deficient in at least one of the respective properties.

TABLE 1

|  |  | Example 1 | Example 2 | Example 3 | Example 4 | Example 5 | Example 6 | Comparative example 1 | Comparative example 2 | Comparative example 3 |
|---|---|---|---|---|---|---|---|---|---|---|
| Matrix polymer |  | PET | PET | PET | PEN | PEN | PET | PET | PET | PET |
| Particles | Composition | A1 | A2 | A3/B | A1 | A4 | A5 | A6 | B1 | B2 |
|  | Average diameter (µm) | 0.5 | 0.4 | 0.2/0.5 | 0.5 | 0.5 | 0.4 | 0.5 | 0.4 | 0.4 |
|  | Content (wt %) | 0.3 | 0.3 | 0.3/0.5 | 0.4 | 0.4 | 0.3 | 0.3 | 0.3 | 0.3 |
|  | Difference from polymer in density \|DP − DM\| (g/$cm^{-3}$) | 0.19 | 0.18 | 0.21/1.3 | 0.18 | 0.20 | 0.20 | 0.20 | 1.3 | 0.8 |
|  | Difference from film in density \|DP − DF\| (g/$cm^{-3}$) | 0.24 | 0.23 | 0.26/1.2 | 0.24 | 0.25 | 0.24 | 0.24 | 1.2 | 0.7 |
| Film | Thickness (µm) | 1/13/1 | 12 (Single) | 1/13/1 | 1/5/1 | 4/5* | 1/13/1 | 1/13/1 | 1/10/1 | 2/11/2 |
|  | Rt/Ra | 9 | 11 | 10 | 9 | 9 | 9 | 9 | 12 | 9 |
|  | Number of protrusions on surface (number/$mm^2$) | 10000 | 9000 | 15000 | 12000 | 10000 | 9000 | 10000 | 9000 | 9000 |
|  | F5 value (MD + TD) (kg/$mm^2$) | 25 | 35 | 27 | 43 | 43 | 27 | 25 | 25 | 25 |
|  | Slipperiness [µk] | 0.28 | 0.29 | 0.25 | 0.26 | 0.28 | 0.29 | 0.27 | 0.29 | 0.27 |
|  | Abrasion resistance <1> | Grade A | Grade B | Grade A | Grade A | Grade A | Grade B | Grade D | Grade D | Grade D |
|  | Abrasion resistance <2> | Grade A | Grade A | Grade A | Grade A | Grade A | Grade B | Grade C | Grade D | Grade D |

TABLE 2

|  |  |  | Example 7 | Example 8 | Example 9 | Comparative example 4 |
|---|---|---|---|---|---|---|
| Matrix polymer |  |  | PET | PET | PET | PET |
| Layer A | High polymer particles | Composition | A1 | A2 | A7 | A8 |
|  |  | Average diameter (µm) | 0.5 | 0.5 | 0.4 | 0.5 |

TABLE 2-continued

|  |  |  | Example 7 | Example 8 | Example 9 | Comparative example 4 |
|---|---|---|---|---|---|---|
|  |  | Content (wt %) | 0.3 | 0.3 | 0.4 | 0.3 |
|  |  | Difference from polymer in density $\|DP - DM\|$ (g/cm$^{-3}$) | 0.19 | 0.18 | 0.20 | 0.20 |
|  |  | Difference from film in density $\|DP - DF\|$ (g/cm$^{-3}$) | 0.25 | 0.23 | 0.24 | 0.24 |
|  |  | Hydroxyl group content of particles (moles/g-particles) | $2 \times 10^{-3}$ | $5 \times 10^{-5}$ | $1 \times 10^{-2}$ | $2 \times 10^{-2}$ |
|  |  | Thermal decomposition temperature (° C.) | 380 | 340 | 360 | 350 |
|  | Particles used together | Composition | Aluminum oxide | Aluminum oxide | Nil | Nil |
|  |  | Average diameter (μm) | 0.1 | 0.1 | — | — |
|  |  | Content (wt %) | 0.2 | 0.2 | — | — |
| Layer B | Particles | Composition | Precipitated Particles | Nil | Nil | Nil |
|  |  | Content (wt %) | 0.3 | — | — | — |
| Layer C | Particles | Composition | A1 | A2 | A8 | A9 |
|  |  | Content (wt %) | 0.3 | 0.3 | 0.4 | 0.3 |

| Film properties | Example 7 | Example 8 | Example 9 | Comparative example 4 |
|---|---|---|---|---|
| Thickness (μm) (Layer A/layer B/layer C) | 2/10/2 | 2/10/2 | 2/10/2 | 2/10/2 |
| Rt/Ra (layer A) | 10 | 11 | 10 | 10 |
| Number of protrusions on surface (number/mm$^2$) (layer A) | 11000 | 9000 | 11000 | 9000 |
| F5 value (MD + TD) (kg/mm$^2$) | 25 | 26 | 26 | 26 |
| Slipperiness, μk (layer A) | 0.26 | 0.29 | 0.28 | 0.28 |
| Abrasion resistance <1> (layer A) | A | B | B | C |
| Abrasion resistance <2> (layer A) | A | B | B | C |

Abbreviations:
PET . . . Polyethylene terephthalate
PEN . . . Polyethylene-2,6-naphthalate
A1 . . . Styrene/bisphenol A diglycidyl ether dimethacrylate copolymer particles
A2 . . . Styrene/resorcinol diglycidyl ether diacrylate copolymer particles
A3 . . . Styrene/cyclohexanedimethanol diglycidyl ether diacrylate copolymer particles
A4 . . . Core layer . . . Styrene/divinylbenzene copolymer particles
Shell layer . . . Styrene/bisphenol A diglycidyl ether dimethacrylate copolymer (0.1 μm thick)
A5 . . . Styrene/ethylene glycol diglycidyl ether dimethacrylate copolymer particles
A6 . . . Styrene/divinylbenzene copolymer particles
A7 . . . Styrene/monoethylene glycol acrylate/divinylbenzene copolymer particles
A8 . . . Styrene/ethylene glycol dimethacrylate copolymer particles
B1 . . . Calcium carbonate particles
B2 . . . Colloidal silica particles
*Organic high polymer particles contained in 4 μm layer

We claim:

1. A film comprising (a) a polyester as a matrix component and (b) 0.005 to 3.0 wt %, by weight of the film, of polymer particles as a particulate component, wherein
   (i) said particles have a volume average particle diameter of 0.005 to 2.0 μm; and
   (ii) said particles have at least an outermost layer of a vinyl based crosslinked polymer comprising hydroxyl groups originating from a crosslinking component having two or more double bonds.

2. A film according to claim 1, wherein at least an outermost layer of the said particles comprises a polymer having a structural unit represented by formula (1)

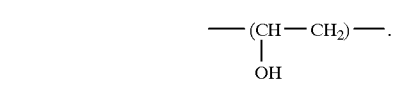

Formula (1)

3. A film according to claim 2, wherein at least an outermost layer of the said particles comprises a polymer having a structural unit represented by formula (2)

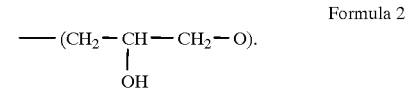

Formula 2

4. A film according to claim 1, having a content of said hydroxyl groups of $1 \times 10^{-4}$ mole to $1 \times 10^{-1}$ mole per 1 g of particles.

5. A film according to claim 4, wherein said hydroxyl group content is $1 \times 10^{-3}$ mole to $5 \times 10^{-2}$ mole per 1 g of particles.

6. A film according to claim 1, wherein said polymer having said hydroxyl groups additionally contains residues of an unsaturated monobasic acid.

7. A film according to claim 1, wherein at least an outermost layer of said polymer particles consists essentially of a copolymer comprising residues derived from (i) an adduct of an unsaturated monobasic acid B and a compound A having at least two glycidyl groups, and (ii) a compound C having at least one vinyl group.

8. A film according to claim 7, wherein said compound A has at least one cyclic structural unit.

9. A film according to claim 8, wherein said cyclic structural unit comprises a ring selected from the group consisting of benzene, cyclohexane, cyclohexene and cylohexanediene rings.

10. A film according to claim 8, wherein said compound A has at least two cyclic structural units.

11. A film according to claim 10, wherein said compound A contains a residue derived from a compound selected from bisphenol A and derivatives thereof.

12. A film according to claim 1, wherein the polymer particles have a thermal decomposition temperature of at least 350° C.

13. A film according to claim 1, wherein said polyester is polyethylene terephthalate.

14. A film according to claim 1, wherein said polyester is polyethylene-2,6-naphthalate.

15. A film according to claim 1, which, in addition to said particular component (b), further comprises 0.005 to 3.0 wt % of particles A, which particles A have a volume average particle diameter of 0.005 to 1.0 μm, are smaller than the said polymer particles (b) by at least 0.1 μm, have a specific surface area of at least 10 m²/g and have a Mohs' hardness of at least 6.

16. A film according to claim 15, wherein said particles A are made of at least one material selected from the group consisting of silicon oxide, aluminum oxide, zirconium oxide, titanium oxide, spinel and iron oxide.

17. A film according to claim 1, which, in addition to said particulate component (b), further comprises 0.005 to 0.3 wt % of particles B, which particles B have a volume average particle diameter of 0.05 to 2.0 μm, a volume average particle diameter differing from that of said polymer particles by at least 0.1 μm and a Mohs' hardness of less than 4.

18. A film according to claim 17, wherein said particles B are made of at least one material selected from the group consisting of talc, calcium sulfate, barium sulfate, calcium carbonate and zinc sulfide.

19. A film according to claim 1, wherein particles precipitated in a reaction system for preparation of said polyester are present therein, in addition to said particulate component (b).

20. A film according to claim 1, wherein said polymer particles have a density (DP) and said film has a density (DF) and wherein a relation between DP and DF is given by formula (3)

$|DP-DF| \leq 0.3$ (g/cm³). Formula (3)

21. A film according to claim 1, having, from at least on one side thereof, $2 \times 10^3$ to $1 \times 10^5$ protrusions/mm².

22. A film according to claim 21, having $3 \times 10^3$ to $5 \times 10^5$ said protrusions/mm².

23. A film according to claim 1, having an F5 value in a machine direction of said film (F5MD) and an F5 value in a transverse direction of said film (F5TD) and wherein a relation between F5MD and F5TD is given by formula (4)

$F5MD+F5TD \geq 30$ kg/mm². Formula (4)

24. A laminate film comprising, as at least one layer thereof, a film comprising (a) a polyester as a matrix component and (b) 0.005 to 3.0 wt %, by weight of the film, of polymer particles as a particulate component, wherein
 (i) said particles have a volume average particle diameter of 0.005 to 2.0 μm; and
 (ii) said particles have at least an outermost layer of a vinyl based crosslinked polymer comprising hydroxyl groups originating from a crosslinking component having two or more double bonds.

25. A laminate film according to claim 24, wherein said at least one layer is at least one outermost said layer.

26. A laminate film according to claim 25, which consists of 3 layers, and has two outermost said layers.

27. A laminate film according to claim 26, having, as a central layer thereof, a polyester film which said polyester film contains particles precipitated in a reaction system for preparation of said polyester.

28. A film according to claim 26, wherein each said outermost layer contains particles, precipitated in a reaction system for preparation of said polyester.

29. A film according to claim 26, wherein at least part of a central layer thereof is a reclaimed polymer.

30. A film according to claim 26, wherein said polymer particles of said particulate component have a volume average particle diameter D (nm) and are present in a said outermost layer having a thickness t (nm) and wherein a relation between D and t is given by formula (5)

$0.2D \leq t \leq 10D$ Formula (5).

31. A magnetic recording medium having, as a substrate, a film comprising (a) a polyester as a matrix component and (b) 0.005 to 3.0 wt %, by weight of the film, of polymer particles as a particulate component, wherein
 (i) said particles have a volume average particle diameter of 0.005 to 2.0 μm; and
 (ii) said particles have at least an outermost layer of a vinyl based crosslinked polymer comprising hydroxyl groups originating from a crosslinking component having two or more double bonds.

32. A film comprising (a) a polyester as a matrix component and (b) 0.005 to 3.0 wt %, by weight of the film, of polymer particles as a particulate component, wherein
 (i) said particles have a volume average particle diameter of 0.005 to 2.0 μm; and
 (ii) said particles have at least an outermost layer of a vinyl based crosslinked polymer comprising hydroxyl groups originating from a crosslinking component as a reaction product of unsaturated monobasic acid and a compound having two or more glycidyl groups.

33. A laminate film comprising, as at least one layer thereof, a film comprising (a) a polyester as a matrix component and (b) 0.005 to 3.0 wt %, by weight of the film, of polymer particles as a particulate component, wherein
 (i) said particles have a volume average particle diameter of 0.005 to 2.0 μm; and
 (ii) said particles have at least an outermost layer of a vinyl based crosslinked polymer comprising hydroxyl groups originating from a crosslinking component as a reaction product of unsaturated monobasic acid and a compound having two or more glycidyl groups.

34. A magnetic recording medium having, as a substrate, a film comprising (a) a polyester as a matrix component and (b) 0.005 to 3.0 wt %, by weight of the film, of polymer particles as a particulate component, wherein
 (i) said particles have a volume average particle diameter of 0.005 to 2.0 μm; and
 (ii) said particles have at least an outermost layer of a vinyl based crosslinked polymer comprising a crosslinking component as a reaction product of unsaturated monobasic acid and a compound having two or more glycidyl groups.

* * * * *